United States Patent [19]
Peitsmeier

[11] 3,988,574
[45] Oct. 26, 1976

[54] COMBINED SWITCH HOUSING FOR WINDSHIELD WIPER AND WASHER INSTALLATION

[75] Inventor: Karl Peitsmeier, Neuhausen, Germany

[73] Assignee: Daimler-Benz Aktiengesellschaft, Germany

[22] Filed: Dec. 20, 1974

[21] Appl. No.: 534,788

[30] Foreign Application Priority Data
Dec. 22, 1973   Germany............................ 2364278

[52] U.S. Cl................................. 200/61.27; 200/4; 200/157; 180/77 H
[51] Int. Cl.² .......................................... H01H 3/16
[58] Field of Search.................... 174/46; 74/471 R; 180/77 H, 78; 340/55; 200/5 R, 18, 156, 157, 61.27, 61.28, 61.54, 61.85, 293, 303, 308, 330, 335, 336, 4

[56] References Cited
UNITED STATES PATENTS

| | | | |
|---|---|---|---|
| 3,302,478 | 2/1967 | Pauwels | 180/78 |
| 3,511,943 | 5/1970 | Kibler | 200/61.27 |
| 3,603,748 | 9/1971 | Cryer | 200/157 |
| 3,859,489 | 1/1975 | Tomlinson | 200/61.27 |

*Primary Examiner*—Gerald P. Tolin
*Attorney, Agent, or Firm*—Craig & Antonelli

[57] ABSTRACT

A switch, particularly for a combined switch housing for a windhsield wiper and washer installation of a motor vehicle which controls both a multistage wiper system as also the washer system combined therewith, the switch housing is a two-partite housing whose upper part is rotatable with respect to the lower part, for example, for purposes of controlling the windshield wiper system whereas it is axially displaceably guided together with the lower part, for example, for purposes of engaging the windshield washer system.

12 Claims, 4 Drawing Figures

COMBINED SWITCH HOUSING FOR WINDSHIELD WIPER AND WASHER INSTALLATION

The present invention relates to a switch housing, especially for to a combined switch for the windshield wiper and washer installation of a motor vehicle which controls both the multi-stage wiper installation as also the washer installation combined therewith.

In already known constructions, only the actuation of the windshield wiper installation is provided in the combination switch which is secured at the free end of a shift lever mounted at the steering column and serving, e.g., as turn-in indicator lever. In this prior art construction, the windhshield wiper installation is turned on and off, for example, by axially pressing-in the combination switch housing. The windshield wiper velocity stage 1 and stage 2 as well as the stage "intermittent wiping" are selectively engaged by a rocker switch disposed in the combination switch.

The windshield washing installation, in contradistinction thereto, is turned on and off by a separate actuating knob, for example, by a foot switch.

It follows therefrom that the actuation of a windshield wiper and washer installation with its several functions is dependent on two separate switches which additionally are arranged spatially separated from one another. Therebeyond, it is also not quite simple with such a separate actuating arrangement to establish the respectively desired operating condition rapidly and without much deliberation.

The present invention is therefore concerned with the task to provide, with means which are simple from a structural as well as a manufacturing point of view, a switch in an effective realization and construction which combines in itself the actuation of the windshield wiper and washer installation and therebeyond represents an improvement of the actuating comfort, with simultaneous prevention of the aforementioned disadvantages.

The underlying problems are solved according to the present invention in that the switch housing is a two-partite housing whose upper part is rotatable with respect to the lower part, for example, for the control of the windshield wiper installation, but which is constructed so as to be axially displaceable together with the lower part, for example, for the control of the windshield washer installation.

In one advantageous embodiment of the present invention, the housing upper and lower parts are secured at the end of a shifting lever and both parts are connected with each other, for example, by a locking pin.

According to another feature of this invention, the axially displaceable and rotatable upper housing part carries on its outer side a symbol corresponding to its use with an arrow disposed therebelow in the direction of its axial displacement and on its lower side another symbol with a further marking which during rotation of the upper part indicates on the lower part the respectively coordinated switching stage.

According to a still further feature of the present invention, the axially displaceable lower housing part carries on its side facing the housing upper part markings offset in the circumference (INT, O, I, II) for the respectively engaged switch stage of the windshield wiper system.

Another construction according to the present invention is characterized in that during the axial displacement of the housing lower part, the two mutually opposite cams of an internal member are guided against rotation in two corresponding grooves provided therefor in the housing lower part.

Finally, a further advantageous construction of the present invention resides in that a relative axial movement of the two housing parts with respect to one another is prevented in that the housing upper part overlaps internally a collar offset in diameter of the housing lower part.

The described embodiment of the two-partite switch housing is precisely also of advantage because it can be assembled in a simple manner by a locking pin or clip connection into a homogeneously acting body. The upper and the lower part thereby possess nearly the same diameter, apart from a slight crowned shape, so that an accurate coordination of the marking arrow on the upper part to the markings on the lower part is possible. On the other hand, the markings INT, O, I, II on the housing lower part may be provided at a predetermined distance to one another nearly in a single plane by reason of its relatively large diameter. Furthermore, the distance between the mutually coordinated markings on the lower part and the marking arrow on the upper part can be so selected by the axial fixing of the two housing parts with respect to one another that an accurate read-off is possible.

Accordingly, it is an object of the present invention to provide a switch housing for a combination switch for the windshield wiper and washer system of a motor vehicle which avoids by simple means the aforementioned shortcomings and drawbacks encountered in the prior art.

Another object of the present invention resides in a switch housing especially for a combined switch for the windshield wiper and washer installation of a motor vehicle, which greatly facilitates actuation and selection of the desired operating conditions.

A further object of the present invention resides in a switch housing for a combined switch for the windshield wiper and washer installation of a motor vehicle which makes it possible to establish the desired operating condition both rapidly and without a great deal of concentration or mental effort.

A still further object of the present invention resides in a switch housing for a combined switch for the windshield wiper and washer installation of a motor vehicle which obviates the need for actuating the two systems from spatially separate switches.

These and other objects, features and advantages of the present invention will become more apparent from the following description when taken in connection with the accompanying drawing which shows, for purposes of illustration only, one embodiment of a combination switch in accordance with the present invention, and wherein.

Figure 1:
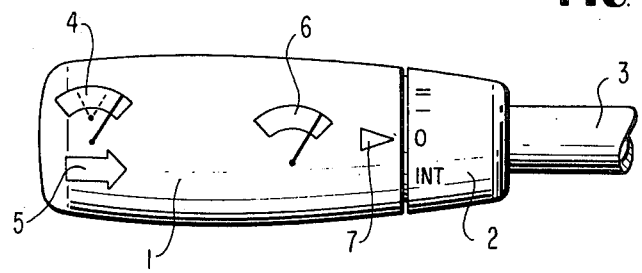
FIG. 1 is an elevational view of a combination switch housing in accordance with the present invention, as viewed from the position of the driver.
Figure 2:
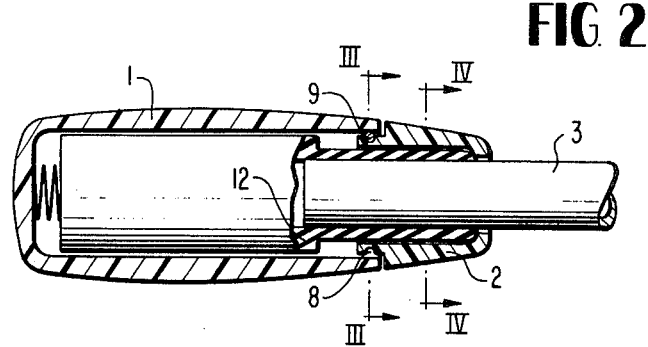
FIG. 2 is a partly broken open view, similar to FIG. 1, with some of the parts thereof shown in cross section.

Referring now to the drawing wherein like reference numerals are used throughout the various views to designate like parts, the combination switch housing as shown in FIGS. 1 and 2 includes a housing upper part 1 and a housing lower part 2 at the end of a tubularly shaped shifting lever 3, serving, for example, as turn indicator actuating lever mounted at the steering column underneath the steering wheel (not shown). A symbol 4 for a combined windshield wiper and washer installation and a directional arrow 5 are provided on the housing upper part 1 as indication of the axial actuating direction to turn on and off this installation. Additionally, a symbol 6 for a windshield wiper installation with an indicating arrow 7 is also provided on the housing upper part 1 nearer the lower end thereof. The markings INT, O, I, II are disposed on the housing lower part 2 which, in conjunction with the indicating arrow 7 on the housing upper part 1 indicate the respective switch stage and therewith the windshield wiper velocity of the installation which is engaged at a given time.

An axial relative movement of the two housing parts 1 and 2 with respect to one another during the switching of the windshield wiper system is prevented in that the housing part 1 overlaps internally a collar 8 of the housing lower part 2 which is offset in diameter so that an axial force applied to the upper surface of the upper housing part 1 will cause both the upper and lower housing parts 1 and 2 to be displaced axially in unison.

Figure 3:
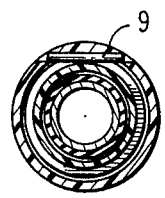
FIG. 3 is a cross-sectional view taken along line III—III of FIG. 2.

FIG. 3 shows a locking or retaining pin 9 as connecting element for the housing upper part 1 and the housing lower part 2, which extends through a secant-like bore through the upper part 1 and engages in a secant-like groove in the lower housing part 2.

Figure 4:
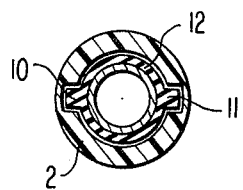
FIG. 4 is a cross-sectional view taken along line IV—IV of FIG. 2.

FIG. 4 illustrates two mutually oppositely disposed cam portions 10 and 11 provided at an internal electrically insulating member 12 of conventional type which are guided in correspondingly constructed complementary grooves of the housing lower part 2 and thus permit an axial displacement movement for switching purposes, yet prevent a relative rotation.

Since the contacts forming the electric switches, which are located in corresponding places within the combination switch housing and are used for the windshield wiper and windshield washer installations, and which are actuated by the relative rotational movement and the axial displacement to close the corresponding electric circuits energizing the windshield wiper driving motor and the pump for the windshield washing installation, are of conventional type, known in the art as such, a detailed description thereof is dispensed with herein.

As can be readily seen from FIGS. 1 and 2, the windshield wiper installation is turned on and off by rotation of the housing upper part 1 with respect to the housing lower part 2 whereby the speed that is selected is indicated by the respective one of the markings INT, O, I or II disposed opposite the arrow 7. On the other hand, the windshield washer system is actuated by axially displacing the housing upper part 1 together with the lower part 2 in the direction of arrow 5, whereby the windshield washing system supplies water jets through nozzles only for such length of time as the two housing parts 1 and 2 remain in the axially displaced positon. A conventional spring thereby seeks to return the two housing parts 1 and 2 into the initial position as soon as the manual actuation, i.e., axial displacement is interrupted. The windshield washer installation is simultaneously turned off again once the two housing parts 1 and 2 are permitted to return to their normal position.

The intermittent wiping during actuation of the windshield washing installation is controlled by a conventional timing element, known as such in the art, for example, by an electric relay which is arranged outside the illustrated switch at a suitable place in the vehicle and is electrically connected with the corresponding switch contacts in the combination switch housing. Of course, after termination of the washing operation, i.e., after termination of the discharge of the jets, the wipers may continue to run through a few more wiping cycles for wiping dry the windshield.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A combination switch housing for a windshield wiper and washer installation of a motor vehicle having a multi-stage windshield wiper system and a windshield washer system with conventional switch means to control both the wiper system and the washer system, characterized in that an electrically insulating member which contains the conventional switch means is disposed in the switch housing which consists of an upper housing portion and a lower housing portion operatively connected together such that the upper housing portion is rotatable with respect to the lower housing portion for selectively controlling one of the two systems while the upper housing portion is axially displaceable together with the lower housing portion with respect to the electrically insulating member for selectively controlling the other of the two systems.

2. A switch housing according to claim 1, characterized in that the upper and lower housing portions are secured at the end of a shifting lever.

3. A switch housing according to claim 2, characterized in that the operative connection between the housing upper and lower portions takes place by a locking pin means.

4. A switch housing according to claim 2, characterized in that the axially displaceable and rotatable housing upper portion carries on its outer side a symbol corresponding to its use with an arrow disposed therebelow indicating the direction of its axial displacement therefor and on its inner side another symbol with a further marking which during rotation of the upper portion on the lower portion indicates the respectively coordinated switch stage.

5. A switch housing according to claim 4, characterized in that the axially displaceable housing lower portion carries on its side facing the housing upper portion markings displaced in the circumferential direction for the respective switch stage of the windshield wiper system.

6. A switch housing according to claim 5, characterized in that the electrically insulating member has two mutually opposite cam means, said cam means being guided in two corresponding grooves provided therefor in the lower housing part, the cam means being guided in said grooves during axial displacement of the upper and lower housing parts.

7. A switch housing according to claim 6, characterized in that a relative axial movement of the two housing parts with respect to one another is prevented in that the upper housing overlaps internally a collar of the lower housing part which is offset in diameter.

8. A switch housing according to claim 7, characterized in that the operative connection between the upper and lower housing portions takes place by a locking pin means.

9. A switch housing according to claim 1, characterized in that the axially displaceable and rotatable housing upper portion carries on its outer side a symbol corresponding to its use with an arrow disposed therebelow indicating the direction of its axial displacement therefor and on its inner side another symbol with a further marking which during rotation of the upper portion on the lower portion indicates the respectively coordinated switch stage.

10. A switch housing according to claim 9, characterized in that the axially displaceable housing lower portion carries on its side facing the housing upper portion markings displaced in the circumferential direction for the respective switch stage of the windshield wiper system.

11. A switch housing according to claim 1, characterized in that the electrically insulating member has two mutually opposite cam means, said cam means being guided in two corresponding grooves provided therefor in the lower housing part, the cam means being guided in said grooves during axial displacement of the upper and lower housing parts.

12. A switch housing according to claim 1, characterized in that a relative axial movement of the two housing parts with respect to one another is prevented in that the upper housing part overlaps internally a collar of the lower housing part which is offset in diameter.

* * * * *